F. ERISMANN.
BRACKET SUPPORT OR THE LIKE.
APPLICATION FILED APR. 1, 1916.
1,229,427.
Patented June 12, 1917.
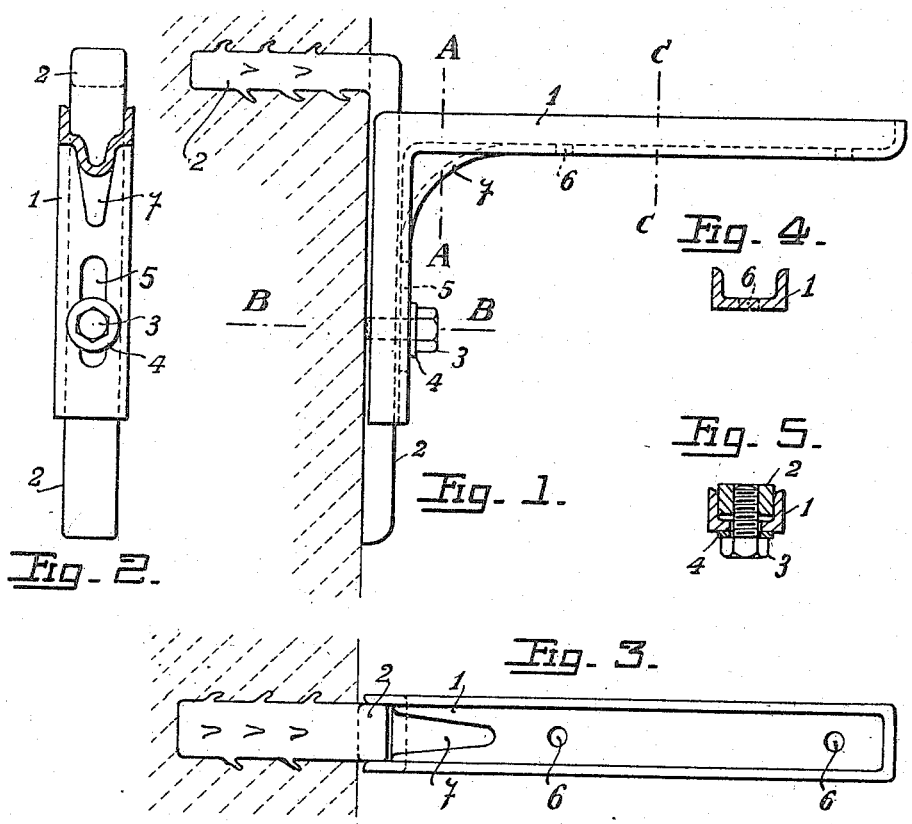

UNITED STATES PATENT OFFICE.

FRITZ ERISMANN, OF LUCERNE, SWITZERLAND.

BRACKET-SUPPORT OR THE LIKE.

1,229,427.  Specification of Letters Patent.  Patented June 12, 1917.

Application filed April 1, 1916.  Serial No. 88,371.

*To all whom it may concern:*

Be it known that I, FRITZ ERISMANN, mechanical engineer, a citizen of the Swiss Confederation, residing at Bruchstrasse No. 34, Lucerne, Switzerland, have invented new and useful Improvements in Bracket-Supports or the like, of which the following is a specification.

The present invention relates to an adjustable bracket or support for any object which has to be supported by a wall or other objects, for instance for scaffolding purposes, for erection of shelves and so on.

The primary object of the invention is to obviate the stays or struts which are usually employed to interconnect the shanks or members of the bracket in order to make the bracket stiff and reliable.

A secondary object of the invention is to make a bracket which is easily adjusted in vertical direction and of which the horizontal member may be made extensible in order to adapt the bracket to any desired purpose.

I attain these and other objects with the bracket which is shown in the accompanying drawings and described in the subjoined description, the essential features of which are particularly pointed out in the appended claim.

In the accompanying drawings similar letters of reference refer to similar parts throughout the specification.

In the drawings:

Figure 1 shows a bracket in side elevation.

Fig. 2 is a section on line A—A of Fig. 1.

Fig. 3 is a top view of the bracket shown in Fig. 1.

Figs. 4 and 5 are sections through the bracket on lines C—C and B—B of Fig. 1 respectively.

In the construction shown in Figs. 1 to 5, 2 denotes a bar of iron, the top end of which is bent off at a right angle and provided with projections. The top end is fixed in the wall in the usual well known manner. On the bar 2 the bracket 1 is adjustably mounted. The bracket 1 comprises two members set at right angle to each other. The bracket 1 is made of one piece of rolled iron having a substantially U-shaped cross-section. At the corner formed by the two members a rib 7 is provided which is pressed out of the material of the bracket as shown in Fig. 2. The rib 7 has to replace the struts and stays which are usually arranged to interconnect the lower end of the vertical members with the outer end of the horizontal member. The rib 7 stiffens the bracket and reduces the cost of manufacture in comparison with that of the customary brackets as used herebefore but obviates as aforesaid the struts which take away much useful space especially when used for scaffolding purposes, for shelves and so on. The vertical member of the bracket 1 is provided with a slot 5 through which a bolt 3 passes. The bolt 3 is screwed into the bar 2 and presses the bracket 1 on to the bar 2 by means of its head and a washer 4. The cross section of bar 2 is such that it fits tightly into the flanges of the bracket 1 in such a manner that any lateral displacement of bar 2 and bracket 1 is obviated if the bolt 3 is firmly screwed on. The horizontal member of the bracket 1 is provided with holes 6 through which bolt may be passed if the object which has to be supported by the horizontal member has to be firmly attached to the bracket 1.

The bar 2 may have any length and more than one bracket may be attached to one bar one above the other. Moreover the cross section of the bracket 1 may be slightly varied. Other means for fixing the bar 2 to the wall may be applied for instance screw bolts, etc.

What I claim and wish to secure by Letters Patent is:

A device of the character described, comprising in combination, a bar, a barbed stem at the end of said bar adapted to be driven into a wall, a bracket comprising two members of U-shaped cross-section in the channel of which said bar is guided and rectangularly disposed to each other, a rib pressed out of the material of the bracket for stiffening the same at the meeting edge of the rectangularly disposed members, a bolt extending through holes of the bracket members into said bar, and a nut and washer on said bolt, substantially as described and for the purpose set forth.

In testimony whereof I affix my signature in presence of two witnesses.

FRITZ ERISMANN.

Witnesses:
CHARLES WILLIAM OECHSTIN,
MARIO BRITTMANN.